United States Patent
Felstead et al.

(10) Patent No.: US 10,563,802 B2
(45) Date of Patent: Feb. 18, 2020

(54) DEVICE FOR HOSE FITTING

(71) Applicant: AVON AUTOMOTIVE UK HOLDINGS LIMITED, Chippenham, Wiltshire (GB)

(72) Inventors: Paul Felstead, Southwick (GB); David Skinner, Chippenham (GB); Joseph Barrie Whiteman, Chippenham (GB)

(73) Assignee: AVON AUTOMOTIVE UK HOLDINGS LIMITED, Chippenham, Wiltshire (GB)

( * ) Notice: Subject to any disclaimer, the term of this patent is extended or adjusted under 35 U.S.C. 154(b) by 130 days.

(21) Appl. No.: 15/819,079

(22) Filed: Nov. 21, 2017

(65) Prior Publication Data

US 2018/0142822 A1 May 24, 2018

(30) Foreign Application Priority Data

Nov. 21, 2016 (FR) .................................... 16 70697

(51) Int. Cl.
*F16L 37/133* (2006.01)
*F16L 33/22* (2006.01)
*F16L 37/138* (2006.01)
*F16L 37/098* (2006.01)
*F16L 41/02* (2006.01)

(52) U.S. Cl.
CPC ........... *F16L 33/225* (2013.01); *F16L 37/133* (2013.01); *F16L 37/0985* (2013.01); *F16L 37/138* (2013.01); *F16L 41/021* (2013.01)

(58) Field of Classification Search
CPC ...... F16L 33/225; F16L 37/133; F16L 37/138; F16L 37/0985; F16L 41/021
See application file for complete search history.

(56) References Cited

U.S. PATENT DOCUMENTS

| 664,177 A | 12/1900 | Scheuber |
| 4,225,162 A * | 9/1980 | Dola ........................ F16L 25/01 174/665 |
| 4,451,069 A * | 5/1984 | Melone ................ F16L 37/0842 285/315 |

(Continued)

FOREIGN PATENT DOCUMENTS

| GB | 2257764 | 1/1993 |
| KR | 101177674 | 8/2012 |

*Primary Examiner* — David Bochna
*Assistant Examiner* — James A Linford
(74) *Attorney, Agent, or Firm* — Burris Law, PLLC

(57) ABSTRACT

A system for coupling at least one flexible hose is provided that includes first and second annular connecting elements. In a system mounting position, the second element is inserted partially into the flexible hose and the first element is mounted on the second element to compress the flexible hose. The first element includes a tubular body, and a proximal end having an annular part. The tubular body is divided from the annular part by axially extending openings that form at least two hooking portions with hook-shaped ends. The second element includes a first sealing projection and a second retaining projection formed beyond the first sealing projection. The second projection cooperates with the hooking portions. More specifically, the annular part comprises an annular inner protrusion to form a constriction between a bottom and top of the sealing projection side facing the said first end of the second element.

11 Claims, 5 Drawing Sheets

(56) References Cited

U.S. PATENT DOCUMENTS 4,564,222 A * 1/1986 Loker ................... F16L 33/18
  285/243
6,641,177 B1  11/2003 Pinciaro

* cited by examiner

DEVICE FOR HOSE FITTING

CROSS-REFERENCE TO RELATED APPLICATIONS

This application claims priority to and the benefit of French Patent Application No. 16/70697 filed on Nov. 21, 2016. The disclosure of the above application is incorporated herein by reference.

FIELD

The present disclosure relates to a system for the fluid-tight clamping of a flexible tube, for example a flexible rubber hose, force fitted onto a tubular member, and concerns seal-joints for coupling flexible hoses. Particularly, the present disclosure concerns joints for coupling flexible hoses for fluid lines, especially, but not exclusively, vehicle fuel and coolant systems in which fluid is conveyed through one or more hoses, pipes, tubes of like conduits. More particularly, the present disclosure is related to a system for connecting a flexible hose of an elastomeric based polymer compound, for example Ethylene Propylene Diene Monomer (EPDM), to another flexible hose or another tubing element.

BACKGROUND

The statements in this section merely provide background information related to the present disclosure and may not constitute prior art.

Fluid lines used in vehicle fuel and coolant systems have to withstand extreme temperature and pressures, without loss of the fluid being conveyed.

It is well known to use a variety of materials to construct the hoses employed in such systems as well as the development of joints to connect the hoses to different components.

U.K. Patent Application No. 2 257 764 describes a fluid tight sealing ring A shown in FIG. 1. It is used for fitting a flexible hose 1 to a rigid tubular element 2. The ring A has an internal hooked projection 7 and an internal clamping projection 8 which are axially spaced apart. The clamping projection 8 of the ring A has an inner diameter which is preferably slightly less than or equal to the outer diameter of the flexible hose 1. The inner diameter of the hooked projection 7 is preferably greater than the nominal outer diameter of said hose. The ring can thus be easily positioned on the end of the hose before it is force fitted on to the rigid tubular element 2. Once the ring A has been positioned onto the hose, the end of the latter is force fitted onto the rigid tubular element 2, and then the ring A is forcedly slid over the hose 1 towards the retaining projection 4 of the rigid tubular element. In order to provide fluid tight connection, a mechanical tool is required. The hooked projection 7 of the ring A has a lead surface 7a which faces outwardly, its profile being inclined like the profile of the surface 4a of the retaining projection 4 of the tubular element 2. The inner diameter of the projection 7 of the ring A is less than the outer diameter of the retaining projection 4 of the rigid tubular element. When the ring A is forcedly slid over the hose 1 fitted onto the rigid tubular element 2, the frusto-conical lead-in surface 7a of the hooked projection first contacts the surface 4a of the retaining projection of the union. As the ring A is thrust further in the direction of the projection 4 of the union, that portion of the ring A formed with the hooked projection 7 deflects elastically so as to ride over the retaining projection 4 of the union to reach the hooked position. Once it has passed this projection, the resilient contraction of that portion of the ring A which had previously deflected forms an almost irreversible engagement of the ring A with the projection 4 of the rigid tubular element 2.

U.S. Pat. No. 6,641,177 for example describes a coupling system for coupling flexible tubing between ports which includes a port element provided with a sharp barb, and a clamp which secures the tubing over the port element. The clamp is forcibly slid along the tubing such that the barbs ride over and then lock about the barb of the port element.

Korean Patent No. KR 101177674 discloses a tube connection structure for connecting an in/outlet, or other accessories of a filter to a purified water line of a water purifier or refrigerator. The tube connection structure comprises tubing and fastening cap which are assembled by forced fit. The fastening cap is equipped with cylindrical metallic reinforcement to reinforce the fitting.

The drawback of these various known coupling systems is that is very hard to assemble manually the coupling system in order to provide a fluid-tight seal. Of course, it is also difficult to disconnect the system without using a tool.

SUMMARY

The present disclosure provides a coupling system which is reversible and which provides a high-quality fluid-tight seal.

The present disclosure further provides a joint for fitting a flexible hose to another component that has a fluid-tight sealing for use in the automotive industry.

Further still, the present disclosure provide a hose joint of simple construction which is easy to assemble and disassemble without a tool, i.e. that provides a reversible connection by means of a push-on mounting, and that is reliable in use.

In one form of the present disclosure, a hose joint which can be used for fluid lines in a vehicle, especially fuel and coolant systems is provided.

These various forms are at least partly obtained by a system for connecting at least a flexible hose, of the type comprising at least first and second annular connecting elements, in which, in a system mounting position, the second element is inserted partially into the flexible hose and the first element is mounted on the second element to compress the flexible hose between the first and second elements, and in which:

the first element comprises a tubular body, one proximal end of which is provided with an annular part and divided, from the annular part by axially extending openings, into at least two hooking portions in the form of axially extending tube fractions with distal hook-shaped ends, allowing the body to expand elastically; and the second element comprises, from a first end, a first sealing projection and a second retaining projection formed beyond the first sealing projection and adapted to cooperate with the hooking portions.

The system is characterized in that the annular part comprises an annular internal protrusion provided with:

an annular surface arranged to form with an outer annular surface of the second element a first substantially radially-oriented constriction located between the sealing projection and the first end of the second element; and a rounded edge arranged to form a second substantially obliquely-oriented constriction with a sealing projection surface facing toward the first end of the second element.

The inventors have discovered that the constrictions (achieved between the internal protrusion of the first element and the outer protrusion of the second element formed by the sealing projection) would have influence on the performance of the fluid tight-joint. By creating constrictions in this area of the coupling system, the quality of fluid seal-joint is improved. Under the action of the constrictions, the hose is compressed and a radial fluid tight seal is created with the interior of the second element.

In addition, thanks to the axially extending openings of the tubular body, the body is allowed to expand elastically and to ride over the retaining projection. Sealing is realized in varying degrees by a first substantially radially-oriented constriction between generally tubular features of first and second elements, as well as a substantially obliquely-oriented constriction located below the top of the sealing projection.

As a result, even if the annular part of the first element is rigid, the coupling system can be connected easily because the first element does not need to be deformed over the sealing projection.

Of course, the coupling system may be removed and replaced manually without undesirable manual effort by pulling outwardly the hooking portions out of the retaining projection with sufficient force to overcome the tendency of the hooking portions to anchor over the retaining projection.

According to another feature of the present disclosure, the constriction results in a compression of the hose in a substantially oblique direction to said axially reference for one stage of seal and a typically lesser compression for the seal which is substantially parallel.

According to another feature of the present disclosure, the first element comprises a step between the inner protrusion and the hooking portions which defines a corner extending in front of the said sealing projection side to form the constriction.

According to another feature of the present disclosure, the two annular first and second elements delimit together a bypass beyond the constriction, shaped to deform and wrap the hose around the sealing projection.

According to another feature of the present disclosure, the second constriction is formed between two round-shaped profiles of the first and second elements.

According to another feature of the present disclosure, the first constriction is formed between two substantially rectilinear shaped inner profiles in axial cross-section of the first and the second elements.

According to another feature of the present disclosure, the corner is round-shaped.

According to another feature of the present disclosure, the first end of the second element is provided with a chamfer in order to facilitate inserting the said first end into the hose.

According to another feature of the present disclosure, the first or second element is made of a relatively stiff material, for example plastic or metal.

According to another feature of the present disclosure, at least one hooking portion is adapted to cooperate with a complementary form of the retaining projection to inhibit longitudinal displacement of the first element with respect to the second element.

According to another feature, at least one hooking portion is adapted to cooperate with a complementary form of the retaining projection to inhibit rotation of the first element with respect to the second element.

According to another feature of the present disclosure, each hooking portion has a circumferential width smaller than that of each said opening.

According to another feature of the present disclosure, the first element comprises a plurality of, but typically four, hooking portions and the same number of openings regularly/irregularly spaced in relation to each other.

The above-described properties, features and advantages of the present disclosure, as well as the manner in which they are achieved, will become clearer and more easily understood in the following schematic description of one form, and they are explained below in greater detail with reference to the drawings. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
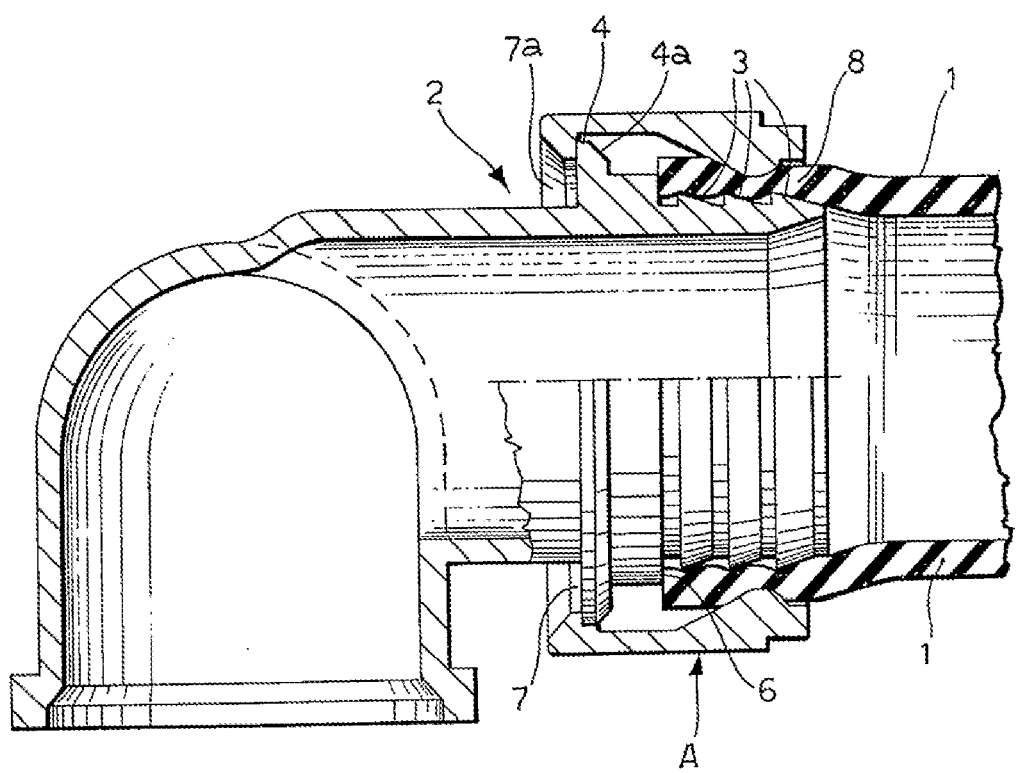
FIG. 1 illustrates an example of a sealing ring according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
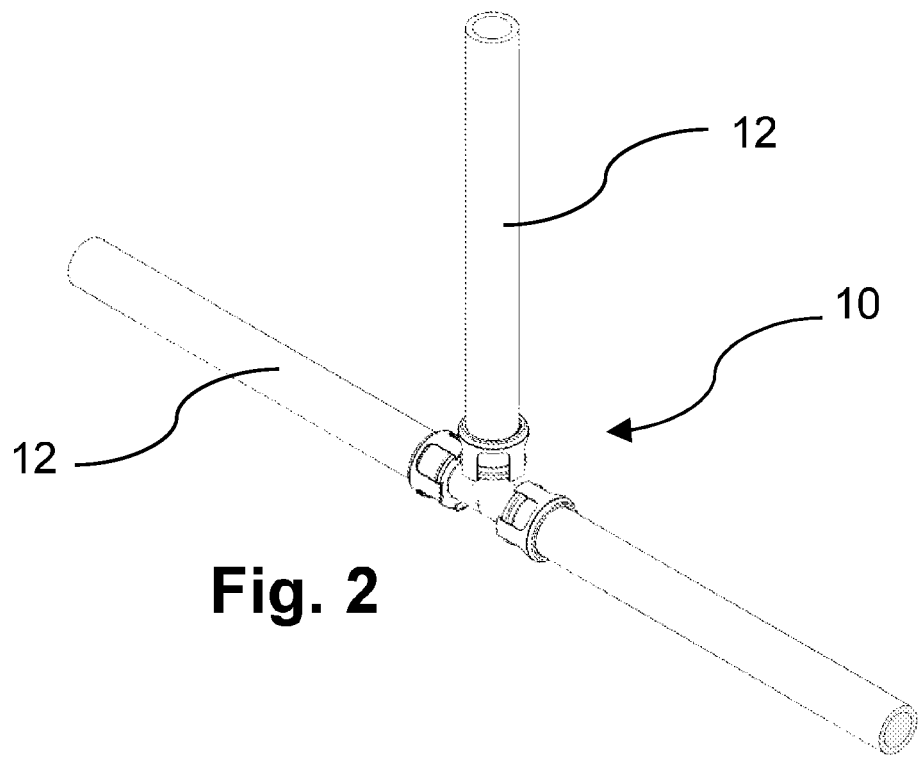
FIG. 2 represents a perspective view of a system in a mounting position with flexible hoses according to one aspect of the present disclosure.

FIG. 2 depicts a system according to a first form of the present disclosure and denoted by the overall reference 10. With reference to FIG. 2, the system 10 is adapted for coupling at least a flexible hose 12, for example a rubber flexible hose. In this example of FIG. 2, the system 10 is adapted for the coupling of three flexible hoses 12.

Figure 3:
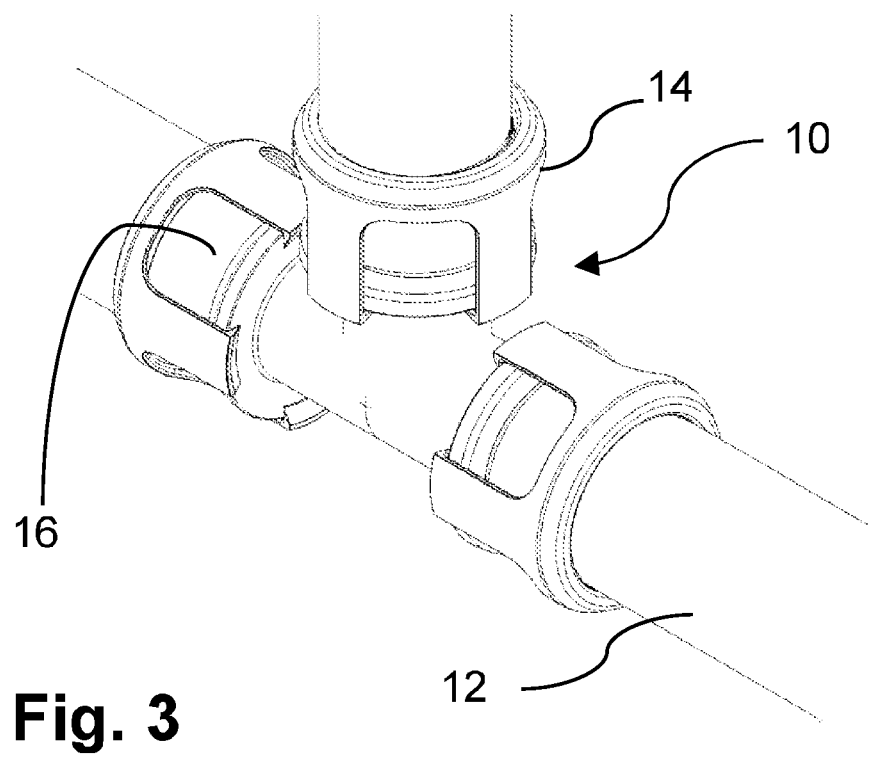
FIG. 3 represents a detailed view of the system of FIG. 2.
Figure 4:
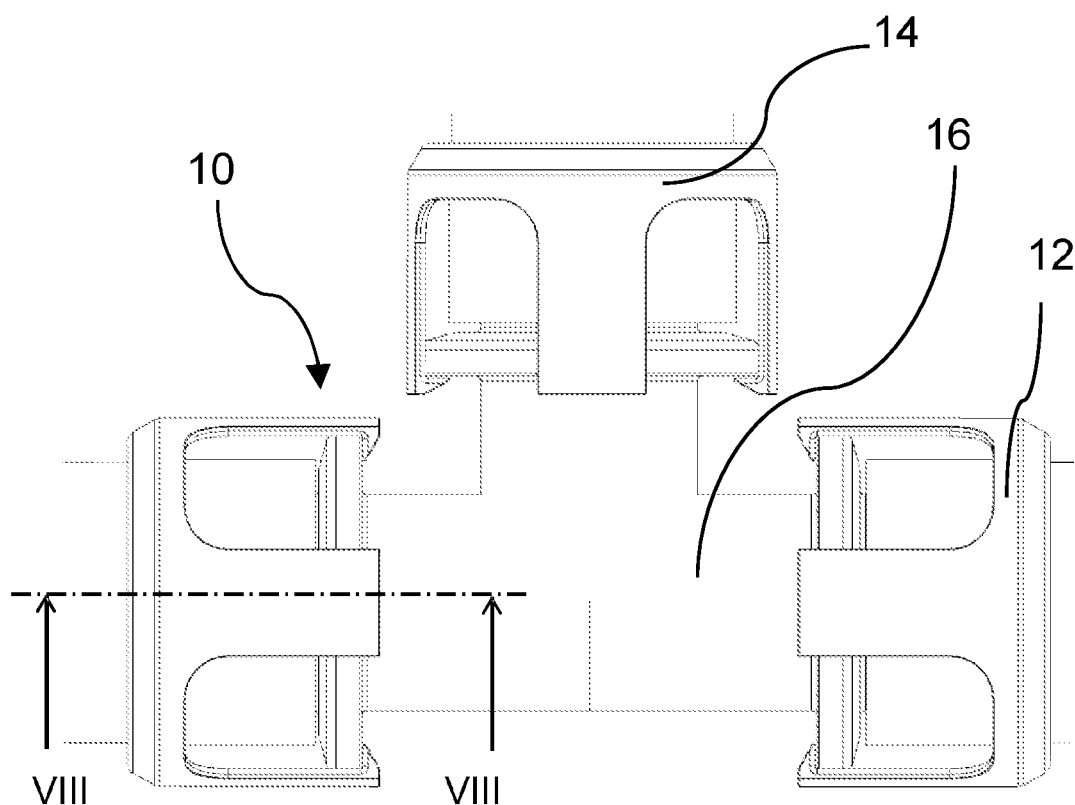
FIG. 4 is a front view of the system of FIG. 3.

With reference to the detailed view of FIGS. 3 and 4, the system 10 comprises a first annular connecting element 14 and a second annular connecting element 16. In a system mounting position illustrated by FIG. 2 to FIG. 4, the second element 16 is inserted partially into the flexible hose 12 and the first element 14 is mounted above the second element 16. In one form, the hose 12 and the first element 14 are loaded on the second element 16 simultaneously.

According to the present disclosure, the first 14 and second 16 elements are arranged in such a way that they compress the flexible hose 12 as it will be explained below.

In one form, the first 14 and/or second 16 element is made of a relatively stiff material, for example plastic or metal.

Figure 5:
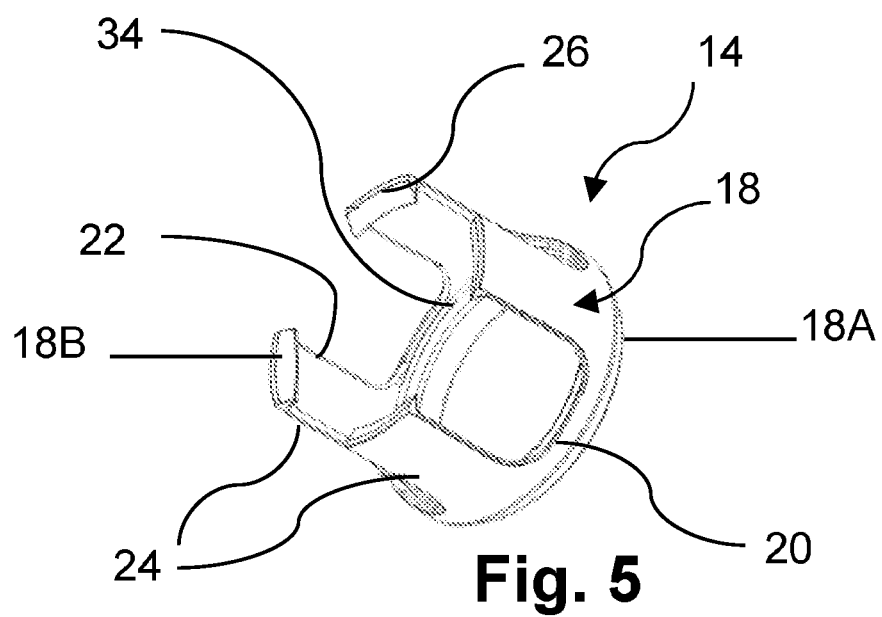
FIG. 5 is a detailed view of a first annular connecting element of the system illustrated in FIG. 2.

With reference now to FIG. 5, the first element 14, described hereinafter as "overclip," comprises a tubular body 18. The tubular body 18 comprises a first proximal end 18A which is provided with an annular part 20. The tubular body 18 is divided from this annular part 20 by axially extending openings 22, into at least two hooking portions 24 in the form of axially extending tube fractions. This allows the body 18 of the overclip 14 to expand elastically.

The hooking portions 24 are provided with distal hook-shaped ends 18B. The hooking portions 24 extend from outer radii of the proximal end 18A in the axial direction to the distal end 18B and terminate in radially inwardly directed hooks 26 having an abutment face.

The outer shape of the overclip 14 is substantially cylindrical, as illustrated in FIG. 5, but it is obvious that other shapes may be suitable such as a prismatic shape.

As illustrated in FIG. 5, each hooking portion 24 has a circumferential width smaller than that of each said openings 22. It is clear, that as a variant, the circumferential width of each hooking portion 24 could be on the same dimension as that of each said openings 22 or greater than that of each said openings 22, depending on the amount of expansion desired and depending on the material stiffness. Furthermore, in the illustrated example, the overclip 14 comprises four hooking portions 24 and four openings 22 regularly spaced in relation to each other.

Figure 8:
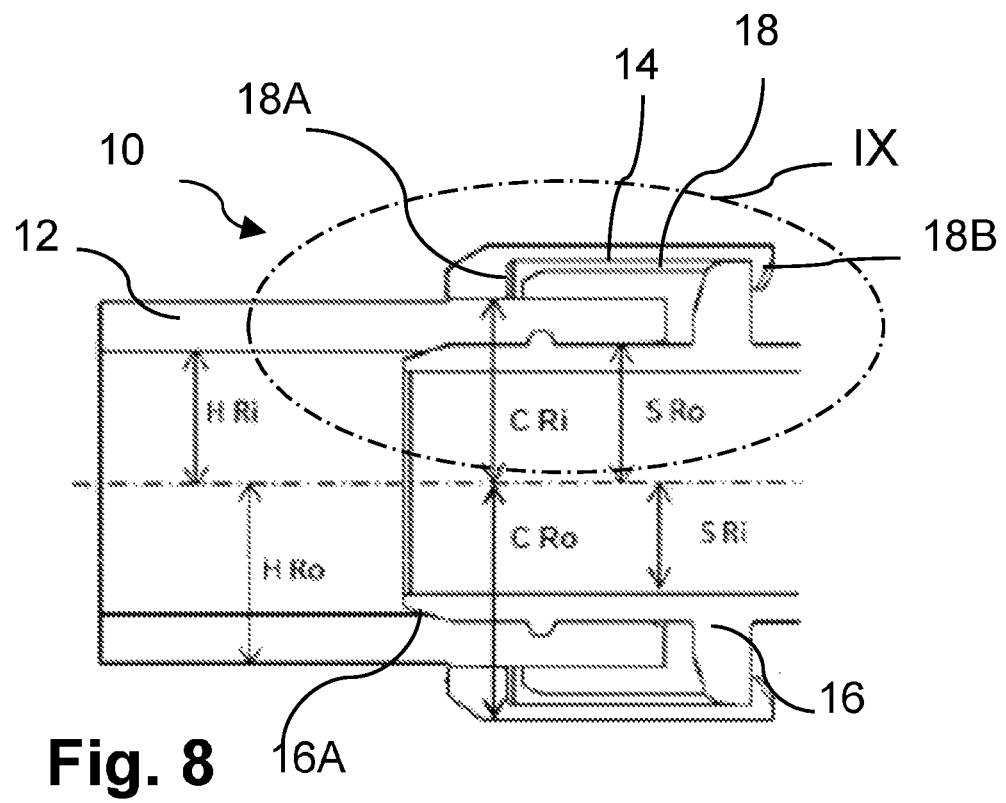
FIG. 8 is a cross-sectional schematic view of the system illustrated in FIG. 3 taken along the line VIII-VIII.

The overclip 14 is made of relatively stiff material and has outer radii CRo and inner radii CRi (FIG. 8). The overclip 14 is made for example of a thermoplastic material, or other.

Figure 6:
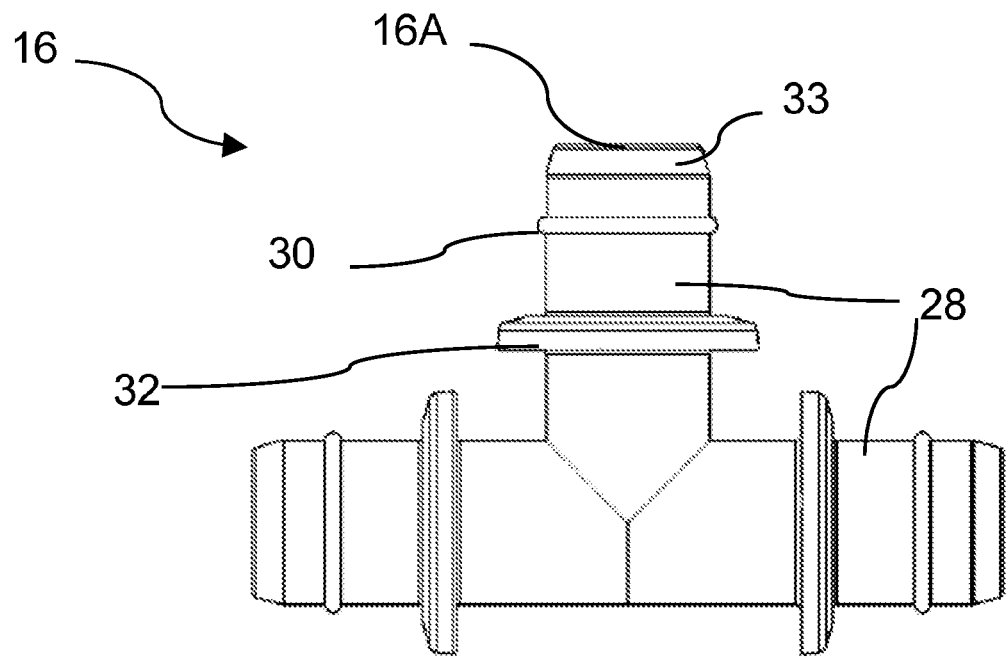
FIG. 6 represents a front view of one form a second annular connecting element according to the present disclosure.

Turning now to FIG. 6, the second annular connecting element 16, also described hereinafter as spigot, comprises three coupling members 28. In the description that follows, only one coupling member 28 will be described in detail. The rectilinear shaped sealing area of spigot 16, in axial cross section, has an outer radii SRo and an inner radii SRi as illustrated in FIG. 8.

The spigot 16 comprises from a first end 16A, a first circumferential sealing projection 30 and a second circumferential retaining projection 32 formed beyond the first sealing projection 30. The second retaining projection 32 is adapted to cooperate with the hooking portions 24 of the overclip 14. The surfaces 35 and 36 are arranged such that the hose can be constricted to form a seal in general perpendicularly between parallel faces SRo and CRi.

The spigot 16 is made of a relatively stiff material, for example thermoplastic reinforced with glass fibers like PA6.6GF30, PPAGF35, etc. The spigot 16 is provided at its first proximal end 16A with a lead in chamfer 33, i.e. an inclined surface in profile, more particularly a frusto-conical surface which is inclining toward the first end 16A. The function of the chamfer 33 is to facilitate the insertion of the first end 16A of the spigot 16 into the flexible hose 12.

In accordance with the mode of execution illustrated in FIG. 6, the first circumferential projection 30 is located at a first axial distance from the first end 16A of the spigot 16. This sealing projection 30 is adapted to form a first seal with the hose 12, when the spigot 16 is inserted into the hose 12.

The second circumferential projection 32 is located a second distance from the first sealing projection 30, the second projection 32 having a larger outer radii than the first projection 30 and forming a shoulder for a snap-fit connection with the abutment face of the hooks 26 of the overclip 14. The circumferential projection 30 or 32 is represented with a circular shape in FIG. 6 but other shapes may be suitable.

According to another form (not shown), the spigot 16 may be provided with more than one first circumferential projection in order to enhance the fluid-tight properties of the seal.

Figure 7:
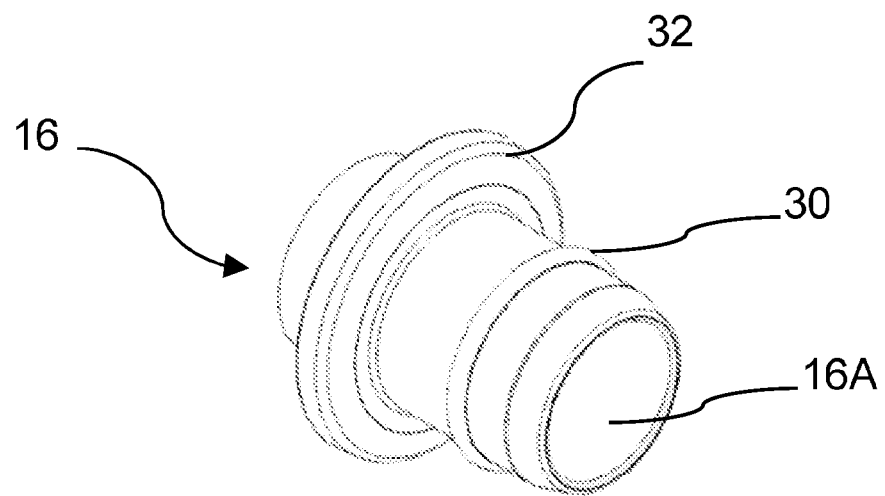
FIG. 7 represents an alternative form of a second annular connecting element according to the present disclosure.

FIG. 7 illustrates another form of the spigot in which the spigot comprises one coupling member to connect one hose 12. A person skilled in the art will understand that the overclip/spigot system according to the present disclosure may be used in many ways to interconnect one hose or several hoses to connectors.

Figure 9:
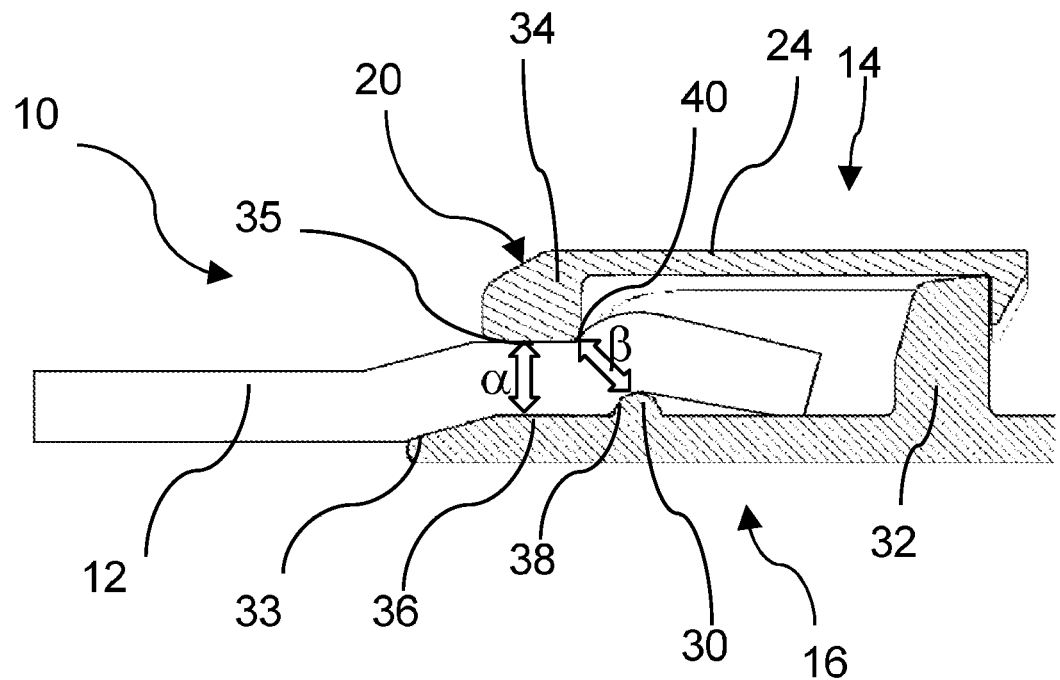
FIG. 9 is a detailed enlarged view of a part circled IX in FIG. 8.

Turning now to FIGS. 8 and 9 which both illustrate cross-sectional views of the system according to the present disclosure, the overclip 14 is mounted with the spigot 16 in order to compress the flexible hose 12. To this end, the annular part 20 comprises an annular internal protrusion 34 shaped to form a first constriction seal $\alpha$ which has the effect of compressing the hose 12 between the two annular surfaces 35 (inner surface of the protrusion 34) and 36 (outer surface of the second element 16 located between its first end 16A and its sealing projection 30) in mounting position, thereby creating or enhancing a seal. In one form, the first constriction $\alpha$ results in a compression of the hose 12 in a substantially perpendicular direction relative to the two substantially parallel surfaces 35 and 36 of the overclip 14 and the spigot 16 (represented by double arrow $\alpha$ in FIG. 9).

Besides, the protrusion 34 is provided with a rounded edge 40 shaped to form a second constriction $\beta$ with the sealing projection 30 between the rounded edge 40 and a side 38 of the projection orientated toward the said first end 16A of the spigot 16. The side 38 of the projection 30 extends between bottom and top of said sealing projection 38.

This second constriction $\beta$ has the effect of compressing the hose 12 between the rounded edge of protrusion 34 and the sealing projection 30 in said system mounting position. In one form, the constriction $\beta$ results in a compression of the hose 12 in a substantially oblique direction to said axially reference of the system (represented by a double arrow in FIG. 9).

This second constriction $\beta$ is located upstream the top of the sealing projection 30, when starting from the proximal end 16A of the spigot 16.

More precisely, the overclip 14 comprises an inner step between the protrusion 34 and the hooking portions 24 which delimits a corner 40 (or rounded edge 40) extending in front of the said sealing projection 30 side in order to form the constriction $\beta$.

As illustrated in detail in FIG. 9, the corner 40 as well as the sealing projection 30 are round-shaped. Thus, the second constriction $\beta$ is formed between two round-shaped profiles of the spigot 16 and the overclip 14. Contrary to prior art, this is not formed between a sharp corner or barb.

In one form, annular elements 14 and 16 are shaped to deform and wrap the hose 12 around the sealing projection 30 beyond the second constriction. In practice, this can be achieved by providing the hooking portions with a specific inner profile in order to impose to the hose, beyond the constriction $\beta$ a localized deformation.

The hose 12 has inner and outer shapes which may vary when subjected to pressure or loads. As can be seen in the FIGS. 8 and 9, the fluid flowing through the hose 12 does not come in contact with the overclip 14. The function of which is to lock the hose 12 against the spigot 16, and to press the inner shape HRi of the flexible hose 12 on the outer shape of the spigot first end 16A, and more specifically directly against both the annular surface 36 extending upstream the sealing projection 30 and the sealing projection side 38.

The second circumferential projection 32 of the spigot 16 is adapted to form a snap-fit with the gripping elements and the inner hooks 26 of the overclip 14, as the inner hooks 26 abut against the shoulder 32 of the second circumferential projection of the spigot 16. The end of the hose 12 is locked between the outer radii of the spigot 16 and annular part 20 of the overclip 14 at its first proximal end 18A. As the overclip 14 and the spigot 16 are made of a relatively stiff material, and the snap-fit assembling provides an elastically deformable seal, the overclip 14 and the spigot 16 may be disconnected from each other and reused.

In one form, at least one hooking portion is adapted to cooperate with a complementary form of the retaining projection to inhibit longitudinal displacement of the first element with respect to the second element (not shown).

In another form, at least one hooking portion is adapted to cooperate with a complementary form of the retaining projection to inhibit rotation of the first element with respect to the second element (not shown).

A person skilled in the art understands that the hooking portions of the overclip may be provided with handles/leverage points (not-shown) in order to facilitate the disconnection of the spigot and the overclip. The spigot provides a loading shoulder at the second circumferential projection for the overclip, so that the spigot and the overclip can be simultaneously assembled and thus enable the correct location for an improved assembly condition by a simultaneous push on the overclip and the hose.

A first feature of the present disclosure is that the seal between the first sealing projection 30 on the spigot 16 and the annular part 20 at the overclip first end 18A provides an outer compression force against the hose 12 between the spigot 16 and the overclip 14. A compression seal of 360° via the hose is provided, that functions like a self-promoting locking seal under tensile load.

A second feature of the present disclosure is that the coupling between hooks of the overclip and the loading shoulder of the second circumferential projection on the spigot provides a reversible snap-fit assembly. This reversible snap-fit connection enables quality support and maintenance services. The second projection has also a function to limit the insertion of the hose onto the spigot and acts as a mechanical stop.

The present disclosure provides means for connecting fluid hoses of a flexible material such as EPDM (for Ethylene Propylene Diene Monomer), that are suitable for engine and ancillary components on an automobile, the connection being reversible and can be assembled by means of push-on-as-one action.

A person skilled in the art understands that the external shape of the overclip can be provided with thrust zones for the hand or the fingers, to facilitate pushing on the overclip. The joint is capable of accommodating defined levels of push on environmental resistance, loads, pull-out loads, blow off pressure and operating pressure without failure.

A person skilled in the art understands that at least one gripping element could cooperate with a complementary shape of the projection in order to block the overclip in rotation.

The flexible hose may be of a mono or multi-layer material of any suitable elastomeric material or combination of elastomeric/non-elastomeric material which may be reinforced to provide the desired properties for a given application. In automotive applications, EPDM is often used. The hose may include one or more thermoplastics, thermoplastic elastomer and/or rubbers (natural or synthetic).

The spigot and the overclip may be made of any material that provides a sufficient rigidity to allow a manual snap-fit connection. For the automotive industry, a relatively rigid plastic material is desired but in other applications a metal is possible.

A person skilled in the art will understand that dimensional modifications of the spigot-overclip system are possible on the size and material of the hose and its industrial application.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for coupling at least a flexible hose, the system comprising:
   a first annular connecting element comprising a tubular body, the tubular body including a proximal end having an annular part, wherein the tubular body is divided from the annular part by axially extending openings into at least two hooking portions in the form of axially extending tube fractions allowing the body to expand elastically, wherein each axially extending tube fraction includes a distal hook-shaped end; and
   a second annular connecting element comprising: from a first end, a first sealing projection; and a second retaining projection formed beyond the first sealing projection, wherein the second retaining projection is adapted to cooperate with the hooking portions of the tubular body,
   wherein, in a system mounting position, the second annular connecting element is partially inserted into the flexible hose and the first annular connecting element is mounted on the second annular connecting element to compress the flexible hose between the first and second annular connecting elements,
   wherein the annular part of the proximal end of the tubular body includes an annular inner protrusion, the annular inner protrusion comprising:
   an annular surface arranged to form a first substantially radially-oriented constriction with an outer annular surface of the second annular connecting element located between the first sealing projection and the first end of the second annular connecting element, wherein said first constriction is formed between two substantially rectilinear shaped profiles in axial cross-section of the first and the second elements, wherein a first profile comprises an inner surface of the first element and a second profile comprises an outer surface of the second element; and
   a rounded edge arranged to form a second substantially obliquely-oriented constriction with a sealing projection surface facing toward the first end of the second annular connecting element.

2. The system according to claim 1, wherein the second obliquely-oriented constriction is configured to create a compression of the hose in a substantially oblique direction to said axially reference.

3. The system according to claim 1, wherein the first radially-oriented constriction is configured to create a compression of the hose in a substantially radial direction.

4. The system according to claim 1, wherein the first annular connecting element further comprises a step between the annular inner protrusion and the hooking portions which defines the rounded edge extending in front of the sealing projection surface to form the second obliquely-oriented constriction.

5. The system according to claim 1, wherein the first and second annular connecting elements are shaped to deform and wrap the flexible hose around the first sealing projection.

6. The system according to claim 1, wherein the second obliquely-oriented constriction is formed between two round-shaped inner profiles in axial cross-section of the first and second annular connecting elements.

7. The system according to claim 1, wherein the first end of the second annular connecting element is provided with a chamfer in order to facilitate inserting the said first end into the flexible hose.

8. The system according to claim 1, wherein at least one of the first annular connecting element and the second annular connecting element is made of plastic or metal.

9. The system according to claim 1, wherein each hooking portion has a circumferential width smaller than that of each axially extending opening.

10. The system according to claim 1 further comprising a plurality of hooking portions and a matching number of axially extending openings are regularly or irregularly spaced in relation to each other.

11. The system according to claim 1, wherein four hooking portions and four axially extending openings are regularly spaced in relation to each other.

* * * * *

UNITED STATES PATENT AND TRADEMARK OFFICE
CERTIFICATE OF CORRECTION

PATENT NO. : 10,563,802 B2
APPLICATION NO. : 15/819079
DATED : February 18, 2020
INVENTOR(S) : Felstead et al.

Page 1 of 1

It is certified that error appears in the above-identified patent and that said Letters Patent is hereby corrected as shown below:

On the Title Page

Item (73) Assignee, "AVON AUTOMOTIVE UK HOLDINGS LIMITED" should be --AKWEL CHIPPENHAM UK LIMITED--.

Signed and Sealed this
First Day of December, 2020

Andrei Iancu
*Director of the United States Patent and Trademark Office*